Jan. 27, 1970 L. STARCK 3,491,874

OPERATING UNIT FOR COMPOSING MACHINES

Filed Dec. 21, 1966 3 Sheets-Sheet 1

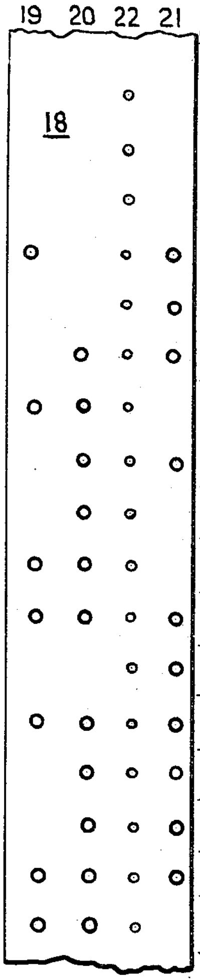

| STEP | 23 COMMAND | 24 SIGNIFICANCE | 25 DELAY TIME | 26 RELEASE TIME |
|---|---|---|---|---|
| 1 | TAPE TRANSPORT | INEFFECTIVE | NONE | NONE |
| 2 | TAPE TRANSPORT | INEFFECTIVE | NONE | NONE |
| 3 | TAPE TRANSPORT | INEFFECTIVE | NONE | NONE |
| 4 | m– SPACE | ASSEMBLER – FAR MATRIX | NONE | MEDIUM |
| 5 | l | ASSEMBLER-NEAR MATRIX | SHORT | MEDIUM |
| 6 | e | ASSEMBLER - NEAR MATRIX | NONE | MEDIUM |
| 7 | b | ASSEMBLER - FAR MATRIX | NONE | MEDIUM |
| 8 | e | MATRIX IDENTICAL TO LAST-BUT-ONE | SHORT | MEDIUM |
| 9 | INTER - WORD SPACE | SPACEBAND FROM SPECIAL MAGAZINE | SHORT | MEDIUM |
| 10 | UPPER RAIL | CHANGE IN FONT | LONG | LONG |
| 11 | UPPER CASE | CHANGE IN CODE | NONE | SHORT |
| 12 | L | UPPER CASE (CAPITAL) MATRIX | NONE | MEDIUM |
| 13 | LOWER CASE | CHANGE IN CODE | NONE | SHORT |
| 14 | e | MATRIX RELEASE | NONE | MEDIUM |
| 15 | e | DOUBLE LETTER | MEDIUM | MEDIUM |
| 16 | UPPER CASE | CHANGE IN CODE | NONE | SHORT |
| 17 | LOWER RAIL | CHANGE IN FONT | LONG | LONG |

Fig. 1.

Jan. 27, 1970 L. STARCK 3,491,874

OPERATING UNIT FOR COMPOSING MACHINES

Filed Dec. 21, 1966 3 Sheets-Sheet 2

Jan. 27, 1970 L. STARCK 3,491,874

OPERATING UNIT FOR COMPOSING MACHINES

Filed Dec. 21, 1966 3 Sheets-Sheet 3

United States Patent Office 3,491,874
Patented Jan. 27, 1970

3,491,874

OPERATING UNIT FOR COMPOSING MACHINES

Leon Starck, Bischofsheim, Germany, assignor to Linotype G.m.b.H., Frankfurt am Main, Germany Filed Dec. 21, 1966, Ser. No. 603,529
Int. Cl. B41b 9/06, 11/14
U.S. Cl. 199—18 6 Claims

ABSTRACT OF THE DISCLOSURE

A control unit for a tape controlled linecasting machine having a plurality of time delay elements in the form of monostable flip-flops that are each independently set to provide a desired time delay. The unit further includes a first and a second storage unit comprising bistable flip-flops that store successively decoded tape signals before the signals are responded to by the machine. A comparison circuit compares the signals stored and depending on the signals, a selected time delay element is utilized to provide an appropriate time delay between the responses to the two signals. Another comparison circuit compares the signal in the second storage unit and the signal on the tape and depending on the signals a selected time element is utilized to control the operation of the linecasting machine.

This invention relates to a method and means for the automatic operation of composing machines under the control of stored information which might, for instance, be contained in a perforated paper tape or the storage of an electronic data processing system.

Composing machines of the type contemplated for use with the present invention are those machines in which matrices or other carriers of characters are assembled to form a line which is reproduced by means of a casting or photographic process. However, the invention also will be applicable to those composing machines in which the casting or photographic reproduction process is done in single steps to produce a line.

Automatic control devices for such composing machines are well known in the art as operating units and these are operated, for instance, by means of a perforated paper tape. The known operating units have been so designed that they principally operate with fixed cycle times that are long enough, under normal operating conditions of the composing machine, to allow the information taken out of the storage device, e.g., perforated paper tape, to become effective on the composing machine, as well as to include delay times necessary under certain circumstances. This information or signals may not only include commands necessary for the release of the carriers of characters, e.g., matrices, or commands necessary for the control of machine operations, but also information that does not affect the composing machine, such as rub-out or transport signals.

It is a disadvantage in such devices that the cycle times are always governed by the longest time intervals required for the proper functioning of the composing machine. Consequently, time is wasted in such cases where the long time interval provided is not necessary for a particular operation of the machine. Thus, in the case of line casting machines equipped with a keyboard having the usual keyboard cam roll, key cams, and further mechanical links to release matrices, it is necessary when releasing "double letters," e.g. *pp*, that the cam attached to the letter *p* completes a full turn after its first actuation before it can be actuated again for the release of the second letter *p*. Contrarily, it is necessary in case of a sequence of matrices released by different cams only to insure that the matrices are assembled in the desired sequence; the different cams can be actuated independently and in a quick sequence without waiting for a complete revolution of the cam roll. Operating units are known which in case of a sequence requiring two successive identical operations will introduce a full cycle delay time before effecting the second operation. This technique of necessity requires a direct relation between the cycle time of the operating unit and the possible turning speed of the keyboard cams.

The present invention is based on the realization that increasing the cam speed makes the release of the character matrices more unreliable; generally, the matrices only follow the laws of gravity during and after their release. A feasible increase of the speed of an automatically controlled composing machine using one of the known operating units could be accomplished by an increase in the turning speed of the keyboard cams. However, this would result in a less reliable operating behavior of the matrices, since these matrices can follow a quicker release to a point only which is determined by the laws of gravity and friction to which the matrices gliding out of the magazine channels are subject. The limits of the release speed determined by these laws have been reached by the known operating units. On the other hand, the known composing machines could operate with a considerably higher average speed if the assembling of the carriers of characters in the desired sequence only were of importance.

It has been found that the goal of a considerably higher average speed for composing machines, controlled automatically by means of stored information, can be achieved by individually determining the minimum time interval relating to each command or sequence of commands necessary for the execution of these commands in the composing machine and then determining the time interval at which these commands become effective on the composing machine.

In accordance with the invention, preferably one or several signals destined for the composing machine are stored after being read, and before they become effective on the composing machine, in order to determine the time intervals required for the performance of the functions called for by the signals. The stored signals are evaluated in relation to their contents and the time interval after which the stored signals can become effective on the composing machine is determined accordingly. The use of an intermediate storage means permits a convenient evaluation of the decoded signals without necessitating their immediately becoming effective on the composing machine after being read.

It was further found to be of advantage if the next signal to be effective on the composing machine can be compared with the immediately following signal with reference to the identity of the matrices to be released. If this comparison indicates a repetitive character signal, a time interval can be provided before the second signal becomes effective. This technique is applied not only to the longer time intervals required for double letters but also to the time interval required for two identical signals separated by a third, different signal (e.g. the two "e's" separated by an "s" in the word reserve). In all these cases a long interval before the release of the next following matrix can be arranged.

A further execution of the new method in accordance with the invention is based on providing a long delay for the release of the second signal in case of identity of two signals in immediate succession; whereas in case of identity of two signals separated by a third, different signal a shorter delay before the execution of the second identical signal is effected. Normally a time interval is given anyway between the two identical signals in the first and third place by the intervening different signal. This interval, however, is not long enough for a quick release of the second identical matrix. Yet if in accordance with the above execution of the invention a shorter delay than a normal delay is introduced in the case of identity of two signals in immediate succession, a desirable gain in time is accomplished.

In case of a sequence of a signal for an assembler-near matrix, i.e. a matrix stored in a leftward channel of the matrix magazine near the assembler, following a signal for an assembler-far matrix, i.e. a matrix stored in a rightward channel of the magazine, it has been found to be of advantage to introduce a delay before the signal for the assembler-near matrix becomes effective. This serves to safeguard that the assembler-near matrix is positioned in the assembler behind the assembler-far matrix. This type of delay thus compensates for the different distances the matrices have to travel and the different matrix speeds governed by the laws of gravity which limit the speed of operation of known linecasting machines.

In accordance with the invention it is further of great advantage if the time delays associated with and necessary for the performance of certain machine operations are provided for before these operations are effected on the composing machine, and if scanned signals are evaluated accordingly to determine these intervals. This theory takes into consideration that in a composing machine completely different machine functions may be affected. Compared to the release of matrices, for instance, the delivery of a line requires a considerably longer time, while the switching of decoding links when changing from "lower case" to "upper case" or vice versa, requires only a fraction of the time required for the release of matrices. When changing from "lower" to "upper rail", more time is required than when releasing matrices.

It is further advantageous in accordance with the invention if signals which are not to become effective on the composing machine are recognized during the reading operation of this or the preceding signals and the next following signal is immediately scanned subsequently. This feature considers that this type of signal, e.g. paper transport perforation or rub-out perforation may be encountered quite frequently and that the scanning of such information represents undesirable down-time for the composing machine.

For the execution of the new procedure in accordance with the invention it is very advantageous to arrange for the operating unit concerned a multitude of timing circuits with different time constants, and to adjust the time constants of these timing circuits in accordance with the minimum times required between the different commands.

The type of timing circuit depends on the type of operating unit. Thus, in the case of an electronic operating unit, the timing circuit may consist of electronic delay means as, for example, monostable flip-flop circuits, the delay defining parts of which may consist of a combination of resistors and condensers. The adjustment of the time constants may in these instances be accomplished by switching condensers and/or resistors or by switching between complete timing circuits which may be monostable flip-flop circuits. In case of pneumatic or mechanical operating units, pneumatic or mechanical delay means are accordingly used which possess the special advantage of being independent of temperature.

In carrying out this construction it is further of advantage in accordance with the invention to introduce at least one intermediate signal storage means and means to compare the signal next to initiate a machine operation with those following. In such a case the comparison means render effective the timing circuit which corresponds to the command concerned.

As intermediate signal storage means, flip-flop type devices are preferred and these may be constructed, depending on the type of operating unit, in an electronic, electro-mechanical or purely mechanical manner, as well as combinations of these various types. As comparison means, logic circuits, such as electronic diode or transistor gates may be used. The use of intermediate signal storage means offers, amongst others, the advantage that after storing the first signal, for instance, scanned from a perforated paper tape, said tape can be moved on for scanning of the following information before the first signal is fully evaluated. Since transporting the paper tape is a mechanical operation which requires a comparatively long period of time, further time can be saved by transporting the tape during the evaluation of the previously scanned signal.

It is of advantage, according to the invention, to use means for the device for evaluating commands before they become effective on the composing machine; where these means, in turn make effective those timing circuits which generate delays corresponding to the sequences of commands in question. The means here proposed consist preferably of timing circuits for generating the delays necessary for the sequence of commands available at the time. It is of special advantage not to assign a timing circuit to each sequence of commands but only to certain groups of sequences of commands selected according to the respective delay requirements.

It is of further advantage, in accordance with the invention, to provide timing circuits with different time constants for generating delays between the scanning of a signal from the storage and the response on the composing machine, as well as timing circuits with different time constants for generating the delays after which this signal becomes effective on the composing machine. This design makes it possible to arrange the selected timing circuits which provide the delay between scanning and the machine response to the signal in such a way that the circuits also determine the point of time when the signals are to become effective on the composing machine.

It may be advantageous, to achieve an economy of design, if only a few timing circuits were provided, but chosen and arranged in such a way, that a timing circuit only or a combination of several are sufficient to obtain all delays necessary.

Further characteristics, advantages and applications of the new invention can be taken from the attached drawing as well as from the following description of a preferred embodiment of the invention.

In the drawing:

FIG. 1 illustrates a perforated tape for the operation of a linecasting machine in simplified form with only three information levels, together with a schedule describing the functions to be effected on the linecasting machine by means of this tape;

Figure 2:
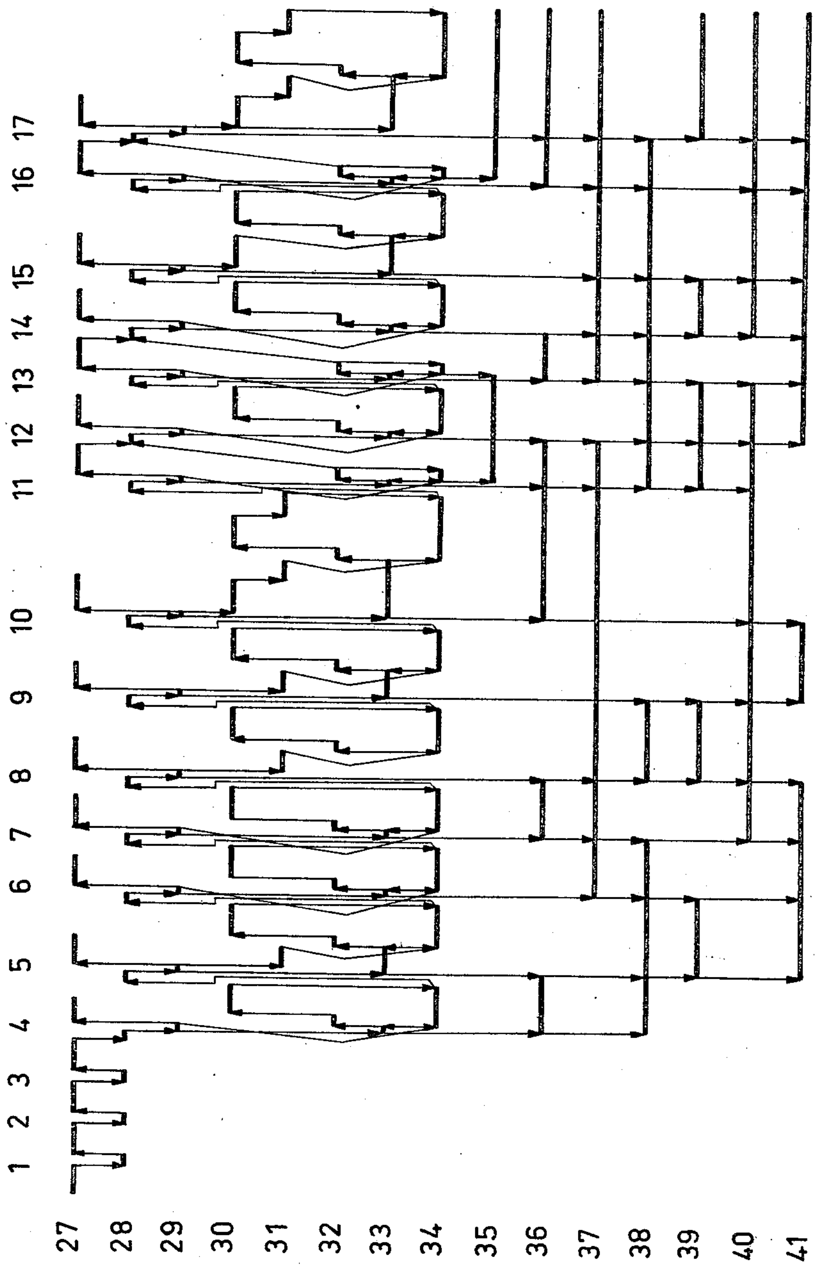
FIG. 2 is a diagram of the time sequences in an operating unit, according to the invention, to effect the functions set forth in FIG. 1.

FIG. 1 shows a perforated tape 18 having by way of illustration three information levels 19, 20, and 21 for each code signal. It might be noted in passing that the usual perforated tape used for controlling linecasting machines includes six information levels. The seventeen signal positions are numbered one to seventeen in a column headed "STEP" just to the right of the tape. Farther to the right four columns 23, 24, 25, and 26 are shown. Column 23 describes the type of commands in the tape 18, column 24 the function to be effected on the composing machine, column 25 the necessary delay before the function becomes effective, and column 26 the time which is required to effect this function on the composing machine. For simplicity's sake, columns 25 and 26 contain four different delay times, e.g. "none," "short," "medium," "long."

In FIG. 2 the above mentioned 17 steps of FIG. 1 are shown in form of a function diagram in which the presence or non-presence of information at fifteen points are entered as functions of time. On the left-hand side of FIG. 2 the numbers 27–41 are entered which refer to the respectively marked outputs of the flip-flops and timing circuits of FIG. 3, described later. On the upper edge, the numbers 1–17 are entered which refer to the above mentioned seventeen steps in accordance with FIG. 1. The time cycles (FIG. 2) at which information is present on the outputs 27–41 are drawn in form of horizontal lines of different length. Between the ends of the horizontal lines there are other almost vertical lines showing arrows which demonstrate the effect of the single information upon each other.

Figure 3:
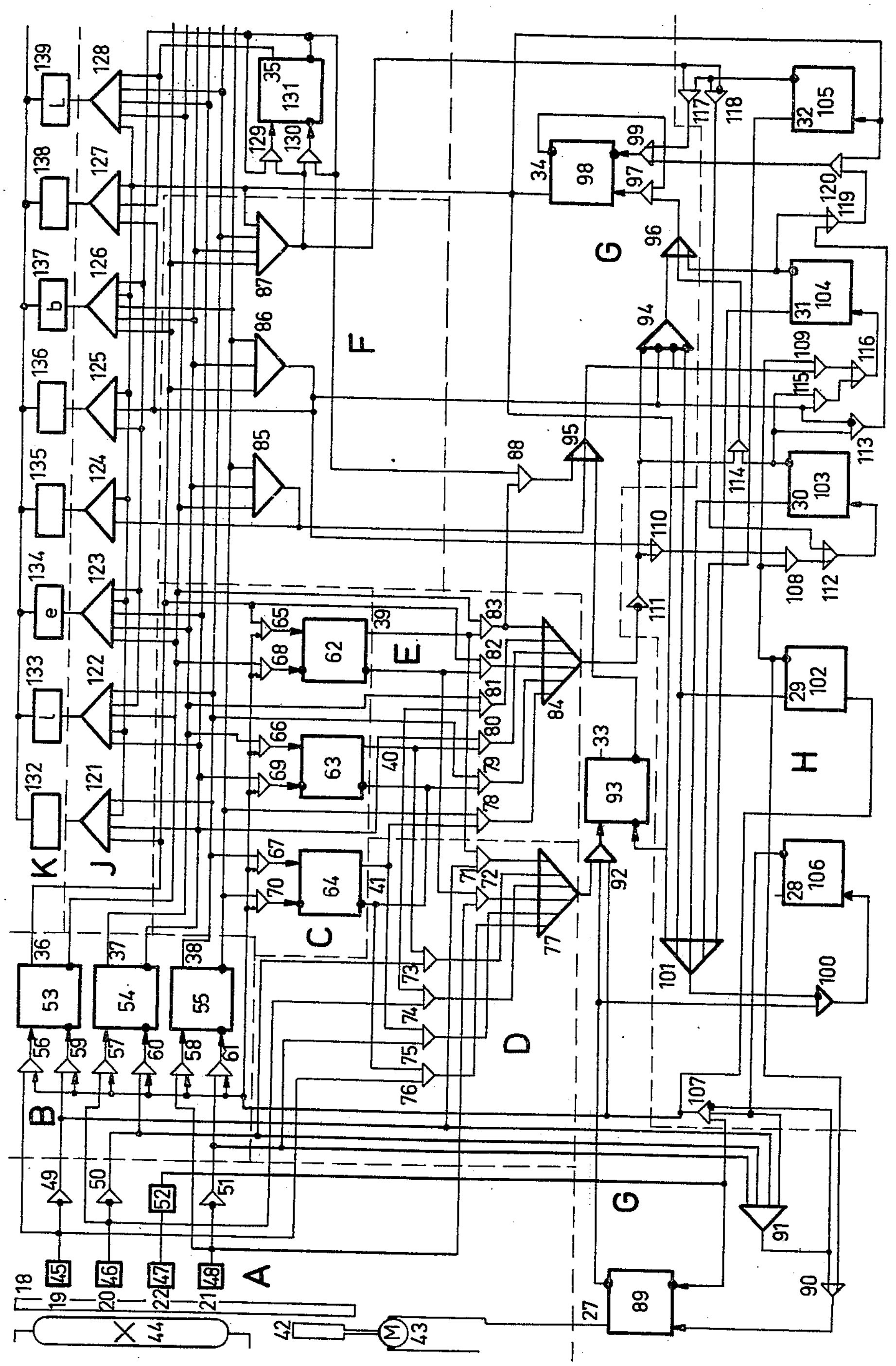
FIG. 3 is a schematic logic diagram of an electronic operating unit, according to the invention.

In the logic diagram of an operating unit shown in FIG. 3, Group A of components, encircled by a dotted line, represents a reader for perforated tape 18 which, in this application, operates photo-electrically in a manner well known in the art. Group B, also encircled by a dotted line, represents a first storage unit for the signals scanned from the tape 18. Group C represents a second storage unit, Group D a first comparison unit, Group E a second comparison unit, Group F a check unit for special signals, Group G a control unit for release and tape transport, Group H a timing unit, Group J a decoding unit, and Group K an electro-mechanical unit which operates the linecasting machine in accordance with the decoded signals.

In Group A is shown the perforated tape 18 with the information levels 19, 20, 21, and the cycling level 22. The perforated tape 18 is moved by means of a roll 42 which is driven by a motor 43. The tape signals (in form of one or several perforations) are scanned photo-electrically; the light source 44 illuminating via one or several tape perforations the respective photo cells 45, 46, 47, 48. In this way information is generated which is inverted in the inverters 49, 50, 51, so that at the output stage of the reader A both positive and negative signals are available for the code. The signal from the photo cell 47 associated with the cycling or transport perforations (located in tape level 22 at each step of the tape) is passed to an impulse generator 52 in order to generate an impulse in its output stage at the time when the tape 18 has reached the exact reading position.

In Group B the bistable flip-flops 53, 54, 55 are assigned to the three information levels 19, 20, 21; these, in turn, have the information outputs 36, 37, 38 which are activated when the respective levels have a code perforation. These flip-flops 53, 54, and 55 are set by the respective code information being scanned via the photo cells 45, 46, 48 and the input AND-gates 56, 57, 58, and thus store the code information. In this way the relative information is available at their outputs 36, 37, 38. If no code information is scanned the flip-flops 53, 54, 55 are reset via the inverters 49, 50, 51 and further AND-gates 59, 60, 61.

Group C represents, as mentioned, a further information storage consisting of bistable flip-flops 62, 63, 64; these take over analogously the information from the information storage B when AND-gates 65, 66, 67, 68, 69, 70 are activated. The respective information is thus made available at the outputs 39, 40, 41.

Group D shows a comparison circuit which compares the information available at the photo cells 45, 46, 48 with the information stored in storage unit C, e.g. in the flip-flops 62, 63, 64. Here, the information outputs of reader A as well as of storage unit C are crossed and connected to AND-gates 71 to 76. If the signals differ, a signal is delivered from the output side of at least one of these gates 71 to 76. Consequently, all outputs of the AND-gates 71–76 are switched to an OR-gate 77 from the output side of which a signal is delivered always if the signals of reader A and storage unit C differ from each other.

Group E shows a further comparison circuit between storage units B and C; here, too, the signals from storage units B and C are crossed and connected to AND-gates 78–83 which also deliver an output signal via an OR-gate 84 in case of a difference of signals in storage units B and C.

Group F serves the testing of special signals. The signal for an interword space, for instance, is obtained at AND-gate 85 when a signal is available at output 37 and no signal is available at outputs 36 and 38. Similarly, AND-gate 86 is connected to the respective outputs of storage unit B so that from its output a signal is delivered in case of a change of font, e.g. "upper rail". In the same way, operation of AND-gate 87 indicates a change in code. An AND-gate 88 registers the lack of a perforation on tape level 19, which follows a signal with the code perforation on tape level 19. See steps 4 and 5 of FIG. 1. This may be advantageously achieved by using AND-gate 83 already provided for other purposes. Such sequences of commands are perferably used for registering a sequence of assembler-near and assembler-far matrices. Since this can in practice only happen with "lower case" characters it is of advantage to introduce into AND-gate 88 a signal from the unmarked output of flip-flop 131. Flip-flop 131 produces a signal on output 35 when it is set for a change in code.

As said, Group G represents a control unit for transport and release. The transport motor 43 for the tape 18 is controlled by the flip-flop 89; this, in turn, is set via an OR-gate 90 either from one of timing circuits 102–106 described in detail in Group H, inversely to output 29 or from AND-gate 91 to the motor 43 through output 27 of flip-flop 89. AND-gate 91 delivers an output signal if inverters 49, 50, 51 show a signal (e.g., no code information being available in the perforated tape 18) which should become effective on the composing machine. A further negative signal from monostable flip-flop 106 is received by AND-gate 91, the negative or inverse signal from flip-flop 106 being obtained when output 28 goes positive. Thus, the transport of the tape 18 is immediately effected after a code combination has been recognized which will not effect a function on the composing machine. This transport is switched off by a further transport perforation on level 22 on the tape 18 generating a switch-off impulse. The impulse is passed via photo cell 47 and impulse generator 52 to flip-flop 89. In a low-inertia construction of the tape drive, consisting of roll 42 and motor 43, the tape 18 can thus be stopped exactly in its reading position.

In case of the tape 18 not being transported, i.e. OR-gate 77 delivering an output signal indicating a state of non-identity between the paper tape code and storage unit C, and the output 28 from the timer 106 dying-out, a bistable flip-flop 93, set via an AND-gate 92, passes the inverse information to a NOR-gate 94 via an OR-gate 95. The gate 94 further receives the inverted information from OR-gate 84, also the information from AND-gate 86, and from the timer H the information at point 29 (see FIG. 2). The OR-gate 95, in turn, receives information from the inverse output of flip-flop 93, the AND-gate 88 and the AND-gate 85. Since these three signals, in accordance with column 25 in FIG. 1 and the above, state that a short delay is to be introduced before the signal becomes effective on the composing machine, the output of OR-gate 95 delivers a "short delay." Correspondingly, the output of AND-gate 86 delivers a "long delay." The output of gate 94 thus delivers a signal if flip-flop 93 is set after the reader A stops because no coincidence exists between reader A and storage unit C. The respective time condition 29 is given from timer H and signals are given from gates 84, 86, and 95 that no double-letter-delay or any other delay should be introduced before the signal becomes effective on the composing machine. The output signal from gate 94 is passed via an OR-gate 96 and further AND-gate 97 to the input of bistable flip-flop 98; at the output 34 of flip-flop 98 the information is generated that the signal may become effective on the composing machine since output 34 is directly connected to gates 121–128 and through them to the actuating means 132–139; e.g., solenoids, to effect an operation of the machine. Besides, the timer H becomes effective in accordance with the information present and resets, via an OR-gate 99, flip-flop 98 after the specified time.

The timing unit of Group H posesses an INHIBIT-gate 100 the positive input of which is connected to the inverse output of bistable flip-flop 89, the negative input of which is connected to the output of an OR-gate 101. This gate 101 receives the information of flip-flop 98, which information also resets the flip-flop 98. Output 34 is directly connected to gate 101 and through gates 120 and 99, a pulse on output 34 will reset flip-flop 98. The additional inputs are connected to the information outputs 29–32 of the timing unit H, to which are assigned the timing circuits 102–105. These circuits 102–105 each comprise a monostable flip-flop. OR-gate 101 thus delivers an output signal if one of these timing circuits 102-105 or flip-flop 98 are switched; consequently, INHIBIT-gate 100 only delivers an output signal if none of these circuits 102–105 and 98 are switched and flop-flop 89 is reset. In this case, timing circuit 106 becomes effective which during its assigned time cycle delivers a signal to output 28 and the relative inverse signal to a further AND-gate 107 as well as to AND-gate 91 mentioned before. AND-gate 107 is connected with its second input to the impulse generator 52 and delivers a signal only if the tape 18 is in scanning position and timing circuit 106 is reset after its cycle.

At the same time, the timing circuit 102 is started, and the contents of storage unit B is transferred to storage unit C via AND-gates 65–70, and the code signal from the tape 18 is transferred to storage unit B via photo cells 45–48, inverters 49–51 and AND-gates 56–61. As mentioned before, the timing circuit 102 delivers, via output 29, a signal to gate 94 and OR-gate 101 at the end of its cycle. The timing circuit 102 delivers a signal to AND-gate 108, OR-gate 90 and AND-gate 109. AND-gate 108 receives a second signal from OR-gate 110 which, in turn, is connected via an inverter 111 to OR-gate 84 and with its second input to AND-gate 86. If a signal requiring a double-letter-delay or another long delay is available, a signal is delivered from the output of AND-gate 108 which via OR-gate 112 starts timing circuit 103 which, in turn, passes a signal to OR-gate 101 via point 30. After the conclusion of the time cycle of timing circuit 103 it delivers a signal to an INHIBIT-gate 113 and to an INHIBIT-gate 114, as well as to an AND-gate 115. The second input of AND-gate 115 is connected to AND-gate 86 to which is also connected the inverse input of INHIBIT-gate 113. Consequently, if a signal for a "long delay" from AND-gate 86 is present, a signal is delivered from the output of AND-gate 115 which starts the timing circuit 104 via an OR-gate 116 which again passes a signal to OR-gate 101 via output 31. After conclusion of its time cycle the timing circuit 104 delivers a signal to flip-flop 98 via OR-gate 96 and an AND-gate 97 and thus makes effective the signal on the composing machine. From output 34, the flip-flop 98 delivers a signal to the timing circuit 105 and starts it; this timing circuit 105, in turn, delivers a signal to OR-gate 101 via output 32. After its cycle, the timing circuit 105 delivers a signal to AND-gate 117 and to an INHIBIT-gate 118 the second inputs of which are controlled by AND-gate 87. If a signal is present at AND-gate 87 (which in accordance with FIG. 1 means a "short delay") an output signal is delivered at AND-gate 117 which returns via OR-gate 99 the flip-flop 98 and thus ends the effect of the function on the composing machine. If no signal is present at gate 87 a signal is delivered from the output of INHIBIT-gate 118 which again starts the timing circuit 103 via OR-gate 112. If, further, a signal is present for a "long delay", for instance via AND-gate 86, a signal is delivered at the output of INHIBIT-gate 113 after conclusion of the cycle of timing circuit 103 which returns the flip flop 98 via an OR-gate 119 and AND-gate 120 and the OR-gate 99.

Group J describes a decoder consisting of AND-gates 121–130 as well as flip-flop 131. The AND-gates 121–130 have the task to decode the information, encoded in accordance with FIG. 1. For this purpose, they are connected to the outputs 36–38 or the corresponding inverse outputs of the flip-flops 53–55 of storage unit B. Besides they are connected to flip-flop 98 which, via output 34, delivers the information as to how long the command should remain effective on the composing machine. The AND-gates 122–130 are further connected to the outputs of bistable flip-flop 131 which effects a change in code. Several commands to which special delays are assigned (in accordance with steps 9, 10, 11, FIG. 1) are decoded by special AND-gates 85–87. It is of advantage to also use the gates 85–87 in Group F so that it is necessary to introduce to AND-gates 124, 125, 127, 129, and 130 only the signal and code characteristics from outputs 34, 35 which are additional to the code.

Group K which is designed to make the evaluated information effective on the composing machine is equipped with actuating means, e.g., 132–139, which are controlled by signals delivered from the outputs of AND-gates 121–128. If necessary, amplifiers should be introduced between the outputs of the AND-gates 121–128 and the corresponding solenoids 132–139.

As a further explanation of execution examples, some function cycles are described in connection with the three Figures, as follows. In accordance with FIG. 1, it is supposed that the first three steps of the perforated tape 18 do not contain a code perforation and thus remain ineffective on the composing machine. As mentioned above (Group G) the transport of the tape 18 is stopped as soon as the light source 44 actuates through the transport perforation on level 22 of the tape 18, the photo cell 47, and thus returns flip-flop 89 via the impulse generator 52. As further described above with respect to Group H, the flip-flop 89 passes a signal via INHIBIT-gate 100 to the timing circuit 106 and starts the time delay provided by circuit 106. The cycle of this circuit need only be very short in an electronic version of the operating unit, yet long enough to ensure that after the conclusion of the cycle of circuit 106 the reader A transmits the information of the tape 18 faultlessly.

As described before with reference to Group G, the AND-gate 91 receives signals from the output inverters 49–51 of the reader A as well as signals from the inverse output of timing circuit 106 and, if, at the end of the cycle of timing circuit 106 no code signal is scanned, a signal is delivered. This signal sets flip-flop 89 via the OR-gate 90. Consequently, the transport of the tape 18 is immediately effected with the very short delay time of the timing circuit 106 in case of tape signals which do not become effective on the composing machine. These functions are repeated in steps 1–3 of FIGS. 1 and 2.

A code being scanned which shall effect the release of a matrix without introducing a delay before, is to be regarded as a standard operation which works as follows (step 4). The transport of the tape 18 is stopped through the return of flip-flop 89, and at the same time the timing circuit 106 is started. After conclusion of its cycle this circuit 106 delivers a signal via AND-gate 107 and AND-gates 56–61 by which the code information scanned from the tape 18 is transmitted into flip-flops 53–55 of storage unit B. If signals are received at outputs 36 and 38 through the code illustrated with step 4, AND-gate 121 can actuate the solenoid 132 as soon as this AND-gate 121 receives a signal from flip-flop 98 via output 34. Via AND-gate 107 and AND-gate 92 flip-flop 93 as well as the timing circuit 102 are actuated which causes a signal to be passed to gate 94, after the extremely short cycle of this timing circuit 102. Since in this case a normal matrix is involved, i.e., no special timing conditions are to be observed, and since this matrix was not preceded by an identical matrix all other conditions for gate 94 are given; thus, after receiving the signal from the timing circuit 102 this gate 94 will pass a signal via OR-gate 96 and AND-gate 97 to flip-flop 98, making the signal effective on the composing machine via AND-gate 121 and solenoid 132.

It is further supposed that a medium release time is necessary for the release of the matrix which is formed from the addition of the cycle times of timing circuits 105 and 103. These become effective as follows. Flip-flop 98 delivers a signal via output 34 to the timing circuit 105 and starts it. Under the above mentioned normal conditions the timing circuits 105 delivers a signal at the end of its cycle via the INHIBT-gate 118 and the OR-gate 112 to the timing circuit 103 which is thus started. The addition of the cycle times of timing circuits 105 and 103 represent the necessary, above mentioned, medium release time. After having concluded its cycle, timing circuit 103 passes a signal via INHIBIT-gate 113, OR-gate 119, AND-gate 120, and OR-gate 99 to flip-flop 98 which is reset by this signal. The resetting effects the switching-off of solenoid 132 via AND-gate 121.

It is to be supposed that step 4 (FIG. 1), mentioned above, calls for an assembler-far matrix, e.g., an em space. It is further to be supposed that the following step 5 calls for an assembler-near matrix and that consequently a short delay is to be introduced before the latter command becomes effective on the composing machine. As can be taken from FIG. 1, the code combinations differ in the paper tape 18 (step 4 and step 5) by a perforation on level 19 being present with step 4; not, however, with step 5. The same difference exists with other combinations for assembler-far and assembler-near matrices as is shown, for instance, at steps 7 and 8 (FIG. 1). The delayed release of an assembler-near matrix following an assembler-far matrix, according to step 5, operates as follows. When resetting flip-flop 98 all timing circuits 102–106 are in their non-operative position; thus, OR-gate 101 does not receive any signal. Thus, INHIBIT-gate 100 is no longer blocked, which makes timing circuit 106 operative as described above. After its cycle this circuit 106 delivers a signal to AND-gates 65–70 via AND-gate 107. By this the code information for the release of a matrix (in accoradnce with step 4) stored in flip-flops 53–55 is transferred to flip-flops 62–64. Besides, as also described above, the newly scanned tape information (step 5) is transferred to flip-flops 53–55 of storage unit B. Since a perforation was present at step 4 on level 19, flip-flop 62 is set and information is available at point 39 which is passed to AND-gate 83. Because no perforation on level 19 is present at step 5, flip-flop 53 remains reset so that the inverse output connected to AND-gate 83 also carries a signal which causes AND-gate 83 to pass a signal to AND-gate 88. This AND-gate 88 is connected with its second input to bistable flip-flop 131 which set in case of a change in code e.g. "upper case."

Since assembler-near matrices can only be "lower case" characters, the above described operation becomes only effective in the basic code position, i.e. "lower case," by means of the fact that AND-gate 88 is connected to the inverse output of flip-flop 131. The output information of AND-gate 88 is delivered via OR-gate 95 to INHIBIT-gate 94 which is blocked by this. Additionally, this information is delivered to AND-gate 109 which is opened for the signal delivered after conclusion of the cycle from timing circuit 102 to gates 94 and 109. The output signal from AND-gate 109 starts, the timing circuit 104 via OR-gate 116. It is assumed that the timing circuit 104 generates the short delay time required for this step. After conclusion of its cycle the circuit 104 passes an impulse to set to flip-flop 98 via OR-gate 96 and AND-gate 97. The working cycle continues similar to that of step 4, with the only difference that in accordance with the different code, AND-gate 122 actuates solenoid 133. Steps 6 and 7 operate similarly to step 4. It is further supposed that the matrix called for at step 8 is identical to the matrix that was called for at step 6. "Identical matrix" means here that these matrices are to be released by the same keyboard cam. It is also supposed that the matrix in accordance with step 8 is an assembler-near matrix, following an assembler-far matrix from step 7. According to step 5, this would mean a short delay time. This delay time is required for correct assembling. The time required by the keyboard cam to complete its cycle also requires a sort delay time, according to the sequence of identical matrices, before the release of step 8. It is of advantage to use only one short delay required for two different reasons; this is done in our example as follows.

During the cycle of timing circuit 106 storage C contains the code information of step 6, storage B the code information of step 7, and reader A contains the newly scanned code information of step 8. To AND-gates 71–76 the corresponding outputs of reader A and storage C are cross-connected so that in case of identity or code information in reader A and storage C no output signal is available at any of the AND-gates 71–76. Since all outputs of AND-gates 71–76 are connected to AND-gate 92 via OR-gate 77, this AND-gate 92 is blocked in this case and flip-flop 93 cannot be set by the timing circuit 106. Consequently, output 33 remains without information and the inverse output of flip-flop 93 opens AND-gate 109 via OR-gate 95. NOR-gate 94 remains blocked because the signal from the inverse output of flip-flop 93 is transmitted thereto through OR-gate 95. From this point step 8 can continue its working cycle as described above in relation to step 5.

It is further supposed that step 9 calls for a space band from a special magazine. Here, too, a short delay shall be introduced before the composing machine responds to the command. After transfer of the information from step 9 to storage B the respective outputs of which are connected to AND-gate 85, a signal is delivered from the output which blocks NOR-gate 94 via OR-gate 95 and opens AND-gate 109. In this case, also, the further working cycle continues as decribed relative to step 5. In this case it is of advantage not to deliver to AND-gate 124, controlling solenoid 135, all code information from storage B but connect this AND-gate 124 to the output of AND-gate 95, which already has decoded the information from storage B. AND-gate 124 now serves the purpose only to determine the release time in accordance with the set time of flip-flop 98.

For the execution of step 10 it is supposed that the font should be changed, to "Italics," for example. This requires a long delay before the signal becomes effective. It is further supposed that actuating the controlling solenoid 136 requires a long release time. The working cycle of step 10 continues, where different from the sequence described above, as follows. The information from storage B is switched to AND-gate 86 in accordance with the code. If a respective command is present, an output signal from AND-gate 86 blocks NOR-gate 94, opens AND-gate 115 directly and AND-gate 108 via OR-gate 110. After conclusion of the cycle of timing circuit 102, this circuit 102 delivers a starting impulse to timing circuit 103 via AND-gate 108 and OR-gate 112 which, as mentioned above, is set for a medium delay. At the end of this cycle, timing circuit 103 delivers a signal via AND-gate 115 and OR-gate 116 to start timing circuit 104 which makes effective a further time cycle at the end of which timing circuit 104 sets flip-flop 98 via OR-gate 96 and AND-gate 97. AND-gate 125 delivers an output signal to solenoid 136 in case of the presence of outputs from flip-flop 98 via point 34, from AND-gate 86 and from the reset flip-flop 131. As described above, timing circuit 105 is started by flip-flop 98 which at the end of its cycle re-starts timing circuit 103 via INHIBIT-gate 118 and OR-gate 112. At the end of its cycle timing circuit 103 re-starts timing circuit 104 via AND-gate 115 and OR-gate 116. This, in turn, resets flip-flop 98 via OR-gate 119, AND-gate 120, OR-gate 99, thus resetting AND-gate 125 and making solenoid 136 ineffective.

In respect to step 11 it is supposed that it requires a change in code, e.g. "upper case," for which no delay time and only a short release time are required. The working cycle up to the setting of flip-flop 98 is identical to that described above in relation to step 4. The code for the change is passed from storage B to AND-gate 87 to which also the signal of flip-flop 98, via point 34, is delivered. In the reset position of flip-flop 131, AND-gate 129 is open and AND-gate 130 blocked. The output signal from AND-gate 87 sets flip-flop 131 via AND-gate 129. Further, flip-flop 98 starts timing circuit 105. After the end of the cycle of this timing circuit 105 flip-flop 98 is reset via AND-gate 117, opened by the output from AND-gate 87, via OR-gate 99. This concludes step 11.

In respect to step 12 it is supposed that an "upper case" matrix identical in code to step 5 is to be released. Since no sequence of an assembler-near following an assembler-far matrix is to be observed no delay is to be introduced before the normal response to the command. The working cycle operates as in respect to steps 4 and 5, with the difference from step 5 that AND-gate 88 is not set by flip-flop 131. Consequently, the working cycle of step 5 is similar to that of step 4; with the only difference that in consequence of a different code, solenoid 139 is actuated via AND-gate 128.

In respect to step 13 it is supposed that a code change, opposite to that in step 11, is required. The working cycle is similar to that of step 11, with the difference that flip-flop 131 is reset via AND-gate 130 which is now open.

In step 14 a matrix should be released in an identical manner to step 4; the operating cycle is identical.

Step 15 requires the second release of the identical matrix of step 14; which makes necessary a medium delay before the command becomes effective on the composing machine. The working cycle of step 15 is similar to that of steps 4 and 8 with the following difference. After storing the tape signal from step 14 into storage C and from step 15 into storage B these signals are compared in the comparison circuit E. In this case, the outputs of the corresponding flip-flops, e.g. 62 and 53, are cross-connected to AND-gates 82 and 83 which only deliver an output signal if the stored information does not agree. The outputs of AND-gates 78–83 are connected to OR-gate 84 which delivers an output signal via inverter 111 to gates 94, 110–114 if the stored information in storages B and C are identical, which is the case in this instance. The NOR-gate 94 is blocked and AND-gate 114 as well as AND-gate 108 via OR-gate 110 are opened. After having concluded its cycle, timing circuit 102 delivers a starting signal to timing circuit 103, via AND-gate 108 and OR-gate 112. At the end of its cycle this timing circuit 103 passes a set-impulse to flip-flop 98 via AND-gate 114, OR-gate 96, and AND-gate 97, which actuates solenoid 134 via AND-gate 123.

Step 16 corresponds to step 11 and its working cycle is identical.

In case of step 17 it is supposed that, by means of the code information identical to step 10, yet after a change in code, the change in font effective from step 10, shall be revoked. The working cycle is similar to that of step 10 with the difference that solenoid 138 is actuated via AND-gate 127. In this case it is of special advantage to use only one AND-gate for decoding as well as for the starting of the time condition of the commands "upper and lower rail."

What is claimed is:

1. A control unit for operating a linecasting machine under the control of a coded tape, said unit comprising a plurality of timing circuits each of which includes a monostable flip-flop that is independently settable to provied a desired time delay for an operation of the linecasting machine, a tape reader for reading signals stored on the tape, storage means wherein said signals are stored prior to being effective to control the machine, said storage means having a bistable flip-flop for each information level on the tape so that the output of the flip-flops and said storage means will represent the presence or the absence of a code perforation for each information level on the tape, means responsive to the output signals from said storage means for evaluating the stored signals to select one of said timing circuits and provide an optimum time delay in the operation of the associated function of the machine, and means responsive to the signals stored in said storage means and to the selected timing circuit for effecting an operation of the machine.

2. A control unit according to claim 1 wherein said storage means includes a first signal storage unit and a second signal storage unit to which signals are transferred after storage in the aforesaid first signal storage unit, each of said storage units having a bistable flip-flop for each information level on the tape so that the output of the flip-flops will represent the presence or the absence of a code perforation for each information level on the tape.

3. A control unit according to claim 2 wherein said evaluating means includes comparison means for comparing the signals stored in said first signal storage unit and said second signal storage unit.

4. A control unit according to claim 2 wherein said evaluating means includes comparison means for comparing the signals stored in said second signal storage unit and the signals read from said tape by said tape reader.

5. A control unit according to claim 1 including means for cumulating the time delays provided by at least two timing circuits.

6. A control unit according to claim 1 wherein said evaluating means includes a plurality of AND-gate means each of which produces an output that depends on a unique combination of output signals from said storage means.

References Cited

UNITED STATES PATENTS

| | | | |
|---|---|---|---|
| 2,062,306 | 12/1936 | Goetz | 199—29 |
| 2,704,595 | 3/1955 | Ackell | 199—18 |
| 2,704,596 | 3/1955 | Ackell | 199—18 |
| 2,786,567 | 3/1957 | Goetz | 199—18 |
| 2,846,055 | 8/1958 | Ackell | 199—18 |
| 2,869,717 | 1/1959 | Rossetto et al. | 199—18 |
| 2,887,214 | 5/1959 | Larson | 199—29 |
| 3,057,458 | 10/1962 | Astier | 199—18 |
| 3,074,537 | 1/1963 | Ackell et al. | 199—23 |
| 3,278,003 | 10/1966 | O'Brien et al. | 199—18 |
| 3,278,004 | 10/1966 | O'Brien et al. | 199—25 X |
| 3,292,764 | 12/1966 | Midgette et al. | 199—25 X |

FOREIGN PATENTS 822,312 10/1959 Great Britain.

ERNEST T. WRIGHT, Jr., Primary Examiner

U.S. Cl. X.R.

199—23